(12) United States Patent
Van Houcke et al.

(10) Patent No.: US 10,005,898 B2
(45) Date of Patent: Jun. 26, 2018

(54) POLYPROPYLENE COMPOUND WITH IMPROVED OPTICAL PROPERTY AND GEL LEVEL

(71) Applicants: Abu Dhabi Polymers Co. Ltd. (Borouge) L.L.C., Abu Dhabi (AE); Borealis AG, Vienna (AT)

(72) Inventors: Daniel Van Houcke, Abu Dhabi (AE); Niraj Dixit, Abu Dhai (AE); Raghvendra Singh, Abu Dhabi (AE)

(73) Assignees: ABU DHABI POLYMERS CO. LTD (BOROUGE) L.L.C., Abu Dhabi (AE); BOREALIS AG, Vienna (AT)

( * ) Notice: Subject to any disclaimer, the term of this patent is extended or adjusted under 35 U.S.C. 154(b) by 0 days. days.

(21) Appl. No.: 15/539,964

(22) PCT Filed: Dec. 28, 2015

(86) PCT No.: PCT/EP2015/081254
§ 371 (c)(1),
(2) Date: Jun. 26, 2017

(87) PCT Pub. No.: WO2016/107830
PCT Pub. Date: Jul. 7, 2016

(65) Prior Publication Data
US 2017/0342248 A1 Nov. 30, 2017

(30) Foreign Application Priority Data
Dec. 30, 2014 (EP) .................................. 14200618

(51) Int. Cl.
| C08L 23/14 | (2006.01) |
| C08J 5/18 | (2006.01) |
| C08L 23/06 | (2006.01) |
| B05D 7/16 | (2006.01) |
| B32B 27/32 | (2006.01) |

(52) U.S. Cl.
CPC .................. *C08L 23/14* (2013.01); *C08J 5/18* (2013.01); *C08L 23/06* (2013.01); *B05D 7/16* (2013.01); *B32B 27/32* (2013.01); *C08J 2323/14* (2013.01); *C08J 2423/06* (2013.01); *C08L 2203/16* (2013.01); *C08L 2207/062* (2013.01)

(58) Field of Classification Search
CPC ...... C08J 5/18; C08J 2423/06; C08J 2423/14; C08L 23/14; C08L 23/06; C08L 2203/16; C08L 2207/062
See application file for complete search history.

(56) References Cited

U.S. PATENT DOCUMENTS

2002/0050319 A1* 5/2002 Nishizawa et al. ..... B32B 27/18
156/245

FOREIGN PATENT DOCUMENTS

| CN | 102070839 | 5/2011 |
| CN | 102079841 | 6/2011 |
| CN | 102224173 | 10/2011 |
| EP | 0887379 | 12/1998 |
| EP | 2251361 | 11/2010 |
| WO | WO9212182 | 7/1992 |
| WO | WO9526867 | 10/1995 |
| WO | 01/42011 | 6/2001 |
| WO | WO0124011 | 6/2001 |
| WO | WO03000754 | 1/2003 |
| WO | WO2004029112 | 4/2004 |
| WO | WO2007077027 | 7/2007 |
| WO | WO03000757 | 5/2010 |
| WO | WO2010057916 | 5/2010 |
| WO | 2013/174733 | 11/2013 |
| WO | WO2014133717 | 9/2014 |

OTHER PUBLICATIONS

International Search Report and Written Opinion for PCT/EP2015/081254 dated Apr. 3, 2016, 9 pgs.
First Office Action and its translation for Application No. 201580071188.1, dated Jan. 19, 2018, 14 pgs.

\* cited by examiner

*Primary Examiner* — Nathan M Nutter
(74) *Attorney, Agent, or Firm* — Lowenstein Sandler LLP

(57) ABSTRACT

Composition for producing films with low amount of gels and good haze, wherein said composition comprises a polypropylene and a high density polyethylene powder.

19 Claims, No Drawings

POLYPROPYLENE COMPOUND WITH IMPROVED OPTICAL PROPERTY AND GEL LEVEL

CROSS-REFERENCE TO RELATED APPLICATION(S)

This application is a national phase of International Application No. PCT/EP2015/081254, filed on Dec. 28, 2015, which claims the benefit of European Patent Application No. 14200618.8, filed on Dec. 30, 2014. The contents of these applications are hereby incorporated by reference in their entirety.

The present invention is directed to a composition comprising a polypropylene and a high density polyethylene having a specific particle size, a film made from this composition and the use of a high density polyethylene having a specific particle size to produce a film with low gel index.

Polymers are increasingly used in different demanding applications. At the same time there is a continuous seek for tailored polymers which meet the requirements of these applications. The demands can be challenging, since many polymer properties are directly or indirectly interrelated. Films of random propylene copolymer are used in wide areas, e.g. food packaging, such as wrapping films and containers. Such films are known for their well-balanced properties like strength, stiffness, transparency and resistance to impact, among others.

To improve the adhesion and/or the slipping properties of the surface of polypropylene films, particularly in case of metalized films, high density polyethylene (HDPE) is added to the polypropylene. However, usually the haze and gel content deteriorate as high density polyethylene (HDPE) is not compatible with polypropylene and has a poor dispersion in the polypropylene matrix. A compatibility component such as maleic acid anhydride grafted polypropylene may be added to compensate therefore. However, adding such a compound usually leads to higher costs.

Thus, there is the need for a composition containing polypropylene and high density polyethylene (HDPE) which has improved optical properties such as haze and low gel content which is inter alia suitable for films.

It has been surprisingly found that this can be achieved using high density polyethylene (HDPE) having a specific particle size.

The present invention provides a composition comprising:
(a) at least 85 parts per weight (ppw) based on 100 ppw of the composition of a polypropylene (PP), and
(b) not more than 15 parts per weight (ppw) based on 100 ppw of the composition of a high density polyethylene (HDPE),
wherein said high density polyethylene (HDPE) has a particle top cut $d_{90}$ of below 1000 μm.

Preferably said composition is obtained by mixing, preferably dry- or melt-mixing, said polypropylene (PP) with said high density polyethylene (HDPE).

Thus the present invention is especially directed to a composition obtained by mixing, preferably by dry- or melt-mixing,
(a) at least 85 parts per weight (ppw) based on 100 ppw of the composition of a polypropylene (PP), and
(b) not more than 15 parts per weight (ppw) based on 100 ppw of the composition of a high density polyethylene (HDPE),
wherein said high density polyethylene (HDPE) has a particle top cut $d_{90}$ of below 1000 μm.

The invention is further directed to a process for producing a composition wherein
(a) at least 85 parts per weight (ppw) based on 100 ppw of the composition of a polypropylene (PP), and
(b) not more than 15 parts per weight (ppw) based on 100 ppw of the composition of a high density polyethylene (HDPE), are mixed, preferably dry- or melt-mixed,
wherein said high density polyethylene (HDPE) has particle top cut $d_{90}$ of below 1000 μm.

The following information relates to all three aspects of the invention discussed above.

It has been surprisingly found that by using a high density polyethylene (HDPE) with a specific particle size, the optical properties of the films made from said composition, such as haze and gel content etc., can be improved while maintaining other properties such as Corona retention. Moreover, adding a compound to improve the compatibility between the HDPE and the PP is not required. Furthermore, when used for a metalized film the adhesion properties and slipping properties are maintained or even improved.

The high density polyethylene (HDPE) preferably has a particle top cut $d_{90}$ of below 1,000 μm, like in the range of 300 to 1,000 μm, more preferably in the range of 300 to 850 μm, still more preferably in the range of 350 to 800 μm, yet more preferably in the range of 400 to 800 μm.

Preferably, the high density polyethylene (HDPE) has a median particle size $d_{50}$ of below 800 μm, like in the range of 200 to 800 μm, more preferably in the range of 300 to 750 μm, still more preferably in the range of 370 to 650 μm, yet more preferably within the range of 385 to 600 μm.

The high density polyethylene (HDPE) preferably has a SPAN of $((D_{90}-D_{10})/D_{50})$, in the range of 1.00 to 1.80, more preferably in the range of 1.10 to 1.60, still more preferably in the range of 1.20 to 1.40.

Due to the indication of the particle size of the high density polyethylene (HDPE) it is apparent that the high density polyethylene (HDPE) is in very fine particulate form. Thus, the high density polyethylene (HDPE) is preferably not in form of pellets or granules, but in form of a powder. That is that the high density polyethylene (HDPE) used in the composition according to this invention is mainly in form of primary particles (i.e. in form of a powder), which is not the case for instance for granules and pellets. This difference is mainly reflected in the particle sizes, which are much lower for powders compared to granules or pellets.

In the present invention a "pellet" is a polymeric particle having a volume of at least 1.0 mm³.

Accordingly, the composition of the present invention may be a physical mixture of the polypropylene (PP) and the high density polyethylene (HDPE) and, optionally further components such as usual additives. Such a physical mixture is also denoted "dry-blend" or "dry-mixed".

Preferably, the composition of the present invention is obtained by melt-mixing the polypropylene (PP) and the high density polyethylene (HDPE) with the required particle size and, optionally further components such as usual additives.

Prior to mixing, preferably melt-mixing, the high density polyethylene (HDPE) is preferably grinded to obtain the particle top cut $d_{90}$, and, optionally, the particle size $d_{50}$ and the SPAN according to the present invention, preferably cryogenically grinded. Usually the high density polyethylene (HDPE) is in the form of pellets prior to grinding, i.e. has a much larger particle size.

In addition, high density polyethylene (HDPE) powder recovered from polymerization reactor directly, or commercially available high density polyethylene (HDPE) powder, can be used in present invention, in case the powder has the required particle size. In such cases, no grinding procedure is needed.

Using high density polyethylene (HDPE) in the form of pellets and grinding them prior to combining with the polypropylene (PP) has the additional advantage that any kind of high density polyethylene (HDPE) can be used and that transport and storage of large quantities of polymeric powder is not required whereby the safety is further improved.

Moreover, by using pellets the high density polyethylene (HDPE) normally already contains the usual additives such as antioxidants etc.

The high density polyethylene (HDPE) according to this invention typically has a density of at least 930 kg/m$^3$, preferably of at least 935 kg/m$^3$, more preferably at least 940 kg/m$^3$, still more preferably in the range of 930 to 970 kg/m$^3$, yet more preferably in the range of 935 to 965 kg/m$^3$, still yet more preferably in the range of 940 to 965 kg/m$^3$.

The high density polyethylene (HDPE) preferably has a melting temperature ($T_m$) in the range of 120 to 150° C., more preferably within the range of 125 to 135° C.

The melt flow rate MFR$_2$ (190° C., 2.16 kg) of the high density polyethylene (HDPE) is preferably within the range of 10 to 35 g/10 min, more preferably within the range of 19 to 30 g/10 min.

The high density polyethylene (HDPE) is preferably an ethylene homopolymer.

Preferably not more than 10 parts per weight (ppw) of the high density polyethylene (HDPE) based on 100 ppw of the composition according to the present invention are used, more preferably not more than 7.5 parts per weight (ppw) of the high density polyethylene (HDPE) based on 100 ppw of the composition of the high density polyethylene (HDPE) according to the present are used.

Preferably at least 90 parts per weight (ppw) based on 100 ppw of the composition of the polypropylene (PP) according to the present invention are used, more preferably at least 92.5 parts per weight (ppw) based on 100 ppw of the composition of the polypropylene (PP) according to the present invention are used.

The polypropylene (PP) is preferably a random propylene copolymer having a comonomer content in the range of 0.5 to 6.0 mol-%. Preferred comonomers are ethylene and/or a $C_4$ to $C_{10}$ α-olefin.

The term "random" indicates that the comonomer ethylene of the propylene ethylene random copolymer (R-PP) is randomly distributed within the propylene copolymer. The term random is understood according to IUPAC (Glossary of basic terms in polymer science; IUPAC recommendations 1996).

Further the polypropylene (PP) according to this invention excludes all heterophasic systems. In other words the polypropylene (PP) according to this invention does not comprise an elastomeric phase.

The polypropylene (PP) may further comprise additives however, this is described further below.

The polypropylene (PP), preferably the random propylene copolymer, has a melt flow rate MFR$_2$ (230° C./2.16 kg) measured according to ISO 1133 in the range from 5 to 15 g/10 min, more preferably from 5 to 11 g/10 min, still more preferably in the range from 7 to 9 g/10 min.

The xylene cold soluble (XCS) content of the polypropylene (PP), is preferably within the range of 1.0 to 10.0 wt.-%, preferably 1.0 to 6.0 wt %. The weight percentage is based on the total weight of the polypropylene (PP).

In a preferred embodiment the polypropylene (PP) is non-visbroken. As known by the person skilled in the art visbreaking can be achieved e.g. by the use of peroxide.

The polypropylene (PP) used in the present invention is preferably obtained using the solid catalyst system (SCS) described in the following.

Solid Catalyst System (SCS)

The preferred solid catalyst system (SCS) used comprises
(a) a transition metal selected from one of the groups 4 to 6, in particular of group 4 of the periodic table (IUPAC), preferably Ti,
(b) a metal which is selected from one of the groups 1 to 3 of the periodic table (IUPAC), preferably Mg,
(c) an internal electron donor (ID),
(d) optionally a cocatalyst, like an aluminum compound, and
(e) optionally an external donor, like an organo silane compound, especially an hydrocarbyloxy silane compound.

The metal is preferably brought in the solid catalyst system (SCS) as a metal compound (CM) which forms with the internal electron donor (ID) or its precursor (P-ID) a complex (C). In turn the transition metal is preferably brought in the solid catalyst system (SCS) as a transition metal compound (CT). Further information concerning this matter is provided below.

A remarkable feature of the solid catalyst system (SCS) preferably used in the present invention is that it is of solid form. In other words for the polypropylene (PP) polymerization preferably a heterogeneous catalysis is applied, i.e. the aggregate state (solid state) of the catalyst system (SCS) preferably used in the present invention differs from the aggregate state of the reactants, i.e. the propylene and other α-olefins used. Different to known solid catalyst systems, the catalyst system (SCS) preferably used in the present invention is a so-called self-supported catalyst system, or in other words the solid catalyst system (SCS) preferably used in the present invention does not comprise in significant amounts catalytically inert material used normally as support material. Inert support material according to this invention is any material which is used to decrease solubility of the catalyst systems in media which are generally used in polymerization processes as well in common solvents like pentane, heptane and toluene. Typical inert support materials are organic and inorganic support materials, like silica, MgCl$_2$ or porous polymeric material. These support materials are generally used in amounts of at least 50 wt.-%, more preferably of at least 70 wt.-%. Accordingly in the preparation of the solid catalyst system (SCS) preferably used in the present invention, no external support material is used and thus the amount of such an inert support material within the solid catalyst system (SCS) is of not more than 10.0 wt.-%, yet more preferably below 5.0 wt.-%, yet more preferably not detectable.

Typically the solid catalyst system (SCS) preferably used in the present invention has a surface area measured according to the commonly known BET method with N$_2$ gas as analysis adsorptive (ASTM D 3663) of less than 30 m$^2$/g, e.g. less than 20 m$^2$/g. In some embodiments the surface area is more preferably of less than 15 m$^2$/g, yet more preferably of less than 10 m$^2$/g. In some other embodiments, the solid catalyst system shows a surface area of 5 m$^2$/g or less, which is the lowest detection limit with the methods used in the present invention.

The solid catalyst particle (SCS) preferably used in the present invention can be additionally or alternatively defined by the pore volume measured according to ASTM 4641. Thus it is appreciated that the solid catalyst particle (SCS) has a pore volume of less than 1.0 ml/g. In some embodiments the pore volume is more preferably of less than 0.5 ml/g, still more preferably of less than 0.3 ml/g and even less than 0.2 ml/g. In another preferred embodiment the pore volume is not detectable when determined according to ASTM 4641.

Moreover the solid catalyst particle (SCS) typically has a mean particle size of not more than 500 μm, i.e. preferably in the range of 2 to 500 μm, more preferably 5 to 200 μm. It is in particular preferred that the mean particle size is below 80 μm, still more preferably below 70 μm. A preferred range for the mean particle size is 5 to 80 μm, more preferred 10 to 60 μm.

The solid catalyst system (SCS) preferably used in the present invention is preferably obtainable, i.e. obtained, by a process comprising contacting (a) a solution of a complex (C) of a metal which is selected from one of the groups 1 to 3 of the periodic table (IUPAC) and an internal electron donor (ID), said complex (C) is obtained by reacting a compound (CM) of said metal with said internal electron donor (ID) or a precursor (P-ID) thereof, with (b) a liquid transition metal compound (CT) or a solution of a transition metal compound (CT).

Accordingly one important aspect of the preparation of the solid catalyst system preferably used in the present invention is that neither the complex (C) nor the transition metal compound (CT) are present in solid form during the solid catalyst system (SCS) preparation, as it is the case for supported catalyst systems.

The solution of a complex (C) of the metal which is selected from one of the groups 1 to 3 of the periodic table (IUPAC) and the internal electron donor (ID) is obtained by reacting a compound (CM) of said metal with said internal electron donor (ID) or a precursor (P-ID) thereof in an organic solvent.

The metal compound (CM) used for the preparation of the complex (C) may be any metal compound (CM) which is selected from one of the groups 1 to 3 of the periodic table (IUPAC). However it is preferred that the complex (C) is a Group 2 metal complex, even more preferred a magnesium complex. Accordingly it is appreciated that the metal compound (CM) used in the preparation of said complex (C) is a Group 2 metal compound, like a magnesium compound.

Thus first a metal compound (CM) which is selected from one of the groups 1 to 3 of the periodic table (IUPAC), preferably from a Group 2 metal compound, like from a magnesium compound, containing preferably an alkoxy moiety is produced. More preferably the metal compound (CM) to be produced is selected from the group consisting of a Group 2 metal dialkoxide, like magnesium dialkoxide, a complex containing a Group 2 metal dihalide, like magnesium dihalide, and an alcohol, and a complex containing a Group 2 metal dihalide, like magnesium dihalide, and a Group 2 metal dialkoxide, like magnesium dialkoxide.

Thus the metal compound (CM) which is selected from one of the groups 1 to 3 of the periodic table (IUPAC), preferably from the Group 2 metal compound, like from the magnesium compound, is usually titaniumless.

Most preferably, the magnesium compound is provided by reacting an alkyl magnesium compound and/or a magnesium dihalide with an alcohol. Thereby, at least one magnesium compound precursor, selected from the group consisting of a dialkyl magnesium $R_2Mg$, an alkyl magnesium alkoxide RMgOR, wherein each R is an identical or a different $C_1$ to $C_{20}$ alkyl, and a magnesium dihalide $MgX_2$, wherein X is a halogen, is reacted with at least one alcohol, selected from the group consisting of monohydric alcohols R'OH and polyhydric alcohols $R'(OH)_m$, wherein R' is a $C_1$ to $C_{20}$ hydrocarbyl group and m is an integer selected from 2, 3, 4, 5 and 6, to give said magnesium compound (CM). R' is the same or different in the formulas R'OH and $R'(OH)_m$. The R of the dialkyl magnesium is preferably an identical or different $C_4$ to $C_{12}$ alkyl. Typical magnesium alkyls are ethylbutyl magnesium, dibutyl magnesium, dipropyl magnesium, propylbutyl magnesium, dipentyl magnesium, butylpentyl magnesium, butyloctyl magnesium and dioctyl magnesium. Typical alkyl-alkoxy magnesium compounds are ethyl magnesium butoxide, magnesium dibutoxide, butyl magnesium pentoxide, magnesium dipentoxide, octyl magnesium butoxide and octyl magnesium octoxide. Most preferably, one R is a butyl group and the other R of $R_2Mg$ is an octyl group, i.e. the dialkyl magnesium compound is butyl octyl magnesium.

The alcohol used in the reaction with the magnesium compound precursor as stated in the previous paragraph is a monohydric alcohol, typically $C_1$ to $C_{20}$ monohydric alcohols, a polyhydric (by definition including dihydric and higher alcohols) alcohol or a mixture of at least one monohydric alcohol and at least one polyhydric alcohol. Magnesium enriched complexes can be obtained by replacing a part of the monohydric alcohol with the polyhydric alcohol. In one embodiment it is preferred to use one monohydric alcohol only.

Preferable monohydric alcohols are those of formula R'OH in which R' is a $C_2$ to $C_{16}$ alkyl group, most preferably a $C_4$ to $C_{12}$ alkyl group, like 2-ethyl-1-hexanol.

Typical polyhydric alcohols are ethylene glycol, propene glycol, trimethylene glycol, 1,2-butylene glycol, 1,3-butylene glycol, 1,4-butylene glycol, 2,3-butylene glycol, 1,5-pentanediol, 1,6-hexanediol, 1,8-octanediol, pinacol, diethylene glycol, triethylene glycol, glycerol, trimethylol propane and pentaerythritol. Most preferably the polyhydric alcohol is selected from the group consisting of ethylene glycol, 2-butyl-2-ethyl-1,3-propanediol and glycerol.

The reaction conditions used to obtain the metal compound (CM) which is selected from one of the groups 1 to 3 of the periodic table (IUPAC), preferably the metal compound (CM) of Group 2, even more preferred the magnesium compound, may vary according to the used reactants and agents. However according to one embodiment of the present invention, said magnesium compound precursor is reacted with said at least one alcohol at temperature of 30 to 80° C. for 10 to 90 min, preferably about 30 min.

After having obtained the metal compound (CM) which is selected from one of the groups 1 to 3 of the periodic table (IUPAC), preferably the metal compound of Group 2, even more preferred the magnesium compound, said compound (CM) is further reacted with an internal electron donor (ID) or electron donor precursor (P-ID). The internal electron donor (ID) is preferably a mono- or diester of a carboxylic acid or diacid, the latter being able to form a chelate-like structured complex, preferably a mono- or diester of an aromatic carboxylic acid or diacid. Said carboxylic acid ester or diester, preferably the mono- or diester of the aromatic carboxylic acid or diacid, can be formed in situ by reaction of an carboxylic acid halide or diacid halide, i.e. a preferred internal electron donor precursor (P-ID), with a $C_2$-$C_{16}$ alkanol and/or diol. Preferably said metal compound (CM) reacts with an internal electron donor precursor (P-ID), i.e. with a dicarboxylic acid dihalide having preferably the formula (I)

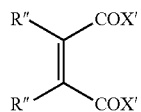

wherein
each R" is an identical or different $C_1$ to $C_{20}$ hydrocarbyl group or both R"s form together with the two unsaturated carbons seen in the formula (I) a $C_5$ to $C_{20}$ aliphatic or aromatic ring, and
X' is a halogen
to give the complex (C).

Among non-aromatic dicarboxylic acid dihalides, the group consisting of maleic acid dihalide, fumaric acid dihalide and their R" substituted derivatives such as citraconic acid dihalide and mesaconic acid dihalide, respectively, are the most important.

Among the cyclic, preferably aromatic, dicarboxylic acid dihalides, the group consisting of phthalic acid dihalide (1,2-benzene dicarboxylic acid dihalide), its hydrogenate 1,2-cyclohexane dicarboxylic acid dihalide, and their derivatives, is the most important. Most preferably, said dicarboxylic acid dihalide is phthaloyl dichloride.

Preferably the magnesium compound is reacted with the dicarboxylic acid halide in a molar ratio $Mg_{total\ added}$/dicarboxylic acid halide of 1:1 and 1:0.1, preferably between 1:0.6 and 1:0.25.

Preferably the metal compound (CM) which is selected from one of the groups 1 to 3 of the periodic table (IUPAC), more preferably the metal compound of Group 2, even more preferably the magnesium compound, is reacted with the internal electron donor (ID) or with the internal electron donor precursor (P-ID), i.e. the dicarboxylic acid dihalide, under at least one of the following conditions:
  adding said dicarboxylic acid dihalide under room temperature and
  heating the obtained reaction mixture to a temperature of 20 to 80° C., preferably of 50 to 70° C.
  keeping the temperature for 10 to 90 min, preferably for 25 to 35 min.

The organic solvent used for the preparation of the complex (C) can be any organic solvent as long as it is ensured that the complex (C) is dissolved at ambient temperatures, i.e. at temperatures up to 80° C. (20 to 80° C.). Accordingly it is appreciated that the organic solvent comprises, preferably consists of, $C_5$ to $C_{10}$ hydrocarbon, more preferably of a $C_6$ to $C_{10}$ aromatic hydrocarbon, like toluene.

Suitable transition metal compounds (CT) are in particular transition metal compounds (CT) of transition metals of groups 4 to 6, in particular of group 4 or 5, of the periodic table (IUPAC). Suitable examples include Ti and V, in particular preferred is a compound of Ti, like $TiCl_4$.

In addition to the compounds described above, the solid catalyst system (SCS) preferably used in the present invention can comprise e.g. reducing agents, like compounds of group 13, preferably Al-compounds containing alkyl and/or alkoxy residues, and optionally halogen residues. These compounds can be added into the solid catalyst system (SCS) preparation at any step before the final recovery.

The solid catalyst system (SCS) preferably used in the invention may comprise in addition to the catalyst components conventional cocatalyst, e.g. those based on compounds of group 13 of the periodic table (IUPAC), e.g. organo aluminum, such as aluminum compounds, like aluminum alkyl, aluminum halide or aluminum alkyl halide compounds (e.g. triethylaluminum) compounds, can be mentioned.

Additionally one or more external donors can be used which may be typically selected e.g. from silanes or any other well known external donors in the field. External donors are known in the art and are used as stereoregulating agent in propylene polymerization. The external donors are preferably selected from diethylamino-triethoxy-silane (U-Donor), hydrocarbyloxy silane compounds and hydrocarbyloxy alkane compounds.

Typical hydrocarbyloxy silane compounds have the formula (II)

wherein
R' is an a- or b-branched $C_3$ to $C_{12}$-hydrocarbyl,
R" a $C_1$ to $C_{12}$-hydrocarbyl, and
0 is an integer 1-3.

More specific examples of the hydrocarbyloxy silane compounds which are useful as external electron donors are diphenyldimethoxy silane, dicyclopentyldimethoxy silane (D-Donor), dicyclopentyldiethoxy silane, cyclopentylmethyldimethoxy silane, cyclopentylmethyldiethoxy silane, dicyclohexyldimethoxy silane, dicyclohexyldiethoxy silane, cyclohexylmethyldimethoxy silane (C-Donor), cyclohexylmethyldiethoxy silane, methylphenyldimethoxy silane, diphenyldiethoxy silane, cyclopentyltrimethoxy silane, phenyltrimethoxy silane, cyclopentyltriethoxy silane, phenyltriethoxy silane. Most preferably, the organo silane compounds are diethylamino-triethoxy-silane (U-Donor), cyclohexylmethyl dimethoxy silane (C-Donor), or dicyclopentyl dimethoxy silane (D-Donor), the latter especially preferred.

After contacting the solution of the complex (C) with the liquid of the transition metal compound (CT) or the solution of the transition metal compound (CT) either the solid catalyst system (SCS) spontaneously precipitates or alternatively an emulsion is formed, the latter being preferred. Whether an emulsion is obtained or an immediate precipitation occurs depend on the specific conditions chosen. Reference is made inter alia to the International patent applications WO 03/000754, WO 03/000757, and WO 2007/077027 as well as to the European patent application EP 2 251 361. In the following the emulsion method is described in more detail.

Emulsion Method:
The solid catalyst system according to the emulsion method is obtained by
(a) preparing a solution of a complex (C) of a metal which is selected from one of the groups 1 to 3 of the periodic table (IUPAC) and an internal electron donor (ID), said complex (C) is obtained by reacting a compound (CM) of said metal with said internal electron donor (ID) or a precursor (P-ID) thereof in an organic solvent,
(b) mixing said solution of complex (C) with a liquid transition metal compound (CT),
(c) obtaining thereby an emulsion of a continuous phase and an dispersed phase, said dispersed phase is in form of droplets and comprises the complex (C) and the transition metal compound (CT),
(d) solidifying the droplets of the dispersed phase obtaining thereby the solid catalyst system (SCS).

Accordingly for the emulsion method the complex (C) is preferably dissolved in an $C_6$ to $C_{10}$ aromatic hydrocarbon, like toluene and contacted with a liquid transition metal compound (CT), preferably with a liquid transition metal compound (CT) of transition metals of groups 4 to 6, in particular of group 4, of the periodic table (IUPAC), like Ti (e.g. TiCl$_4$). Due to the contact of the solution of the complex (C) with the liquid transition metal compound (CT) an emulsion is formed. The production of a two-phase, i.e. of an emulsion, is encouraged by carrying out the contacting at low temperature, specifically above 10° C. but below 60° C., preferably between above 20° C. and below 50° C. The emulsion comprises a continuous phase and a dispersed phase in form of droplets. In the dispersed phase the complex (C) as well as the transition metal compound (CT) are present.

Additional catalyst components, like an aluminium compound, like aluminium alkyl, aluminium alkyl halide or aluminium alkoxy or aluminium alkoxy alkyl or halide or other compounds acting as reducing agents can be added to the reactions mixture at any step before the final recovery of the solid catalyst system. Further, during the preparation, any agents enhancing the emulsion formation can be added. As examples can be mentioned emulsifying agents or emulsion stabilisers e.g. surfactants, like acrylic or metacrylic polymer solutions and turbulence minimizing agents, like alpha-olefin polymers without polar groups, like polymers of alpha olefins of 6 to 20 carbon atoms.

Suitable processes for mixing the obtained emulsion include the use of mechanical as well as the use of ultrasound for mixing, as known to the skilled person. The process parameters, such as time of mixing, intensity of mixing, type of mixing, power employed for mixing, such as mixer velocity or wavelength of ultrasound employed, viscosity of solvent phase, additives employed, such as surfactants, etc. are used for adjusting the size of the solid catalyst system (SCS) particles.

Said solid catalyst system (SCS) particles may then be formed and recovered in usual manner, including the solidification of the catalyst particles by heating (for instance at a temperature of 70 to 150° C., more preferably at 90 to 110° C.) and separating steps (for recovering the catalyst particles). In this connection reference is made to the disclosure in the international applications WO 03/000754, WO 03/000757, WO 2007/077027, WO 2004/029112 and WO 2007/077027 disclosing suitable reaction conditions. This disclosure is incorporated herein by reference. The solid catalyst particles (SCS) obtained may furthermore be subjected to further post-processing steps, such as washing, stabilizing, pre-polymerization, prior to the final use in polymerisation process.

In a preferable embodiment of the preparation of the catalyst, the solid catalyst component is prepared by a process comprising: preparing a solution of magnesium complex by reacting an alkoxy magnesium compound and an electron donor or precursor thereof in a $C_6$-$C_{10}$ aromatic liquid reaction medium; reacting said magnesium complex with a compound of at least one four-valent Group 4 metal at a temperature greater than 10° C. and less than 60° C. to produce an emulsion of a denser, TiCl$_4$/toluene-insoluble, oil dispersed phase having, Group 4 metal/Mg mol ratio 0.1 to 10 in an oil disperse phase having Group 4 metal/Mg mol ratio 10 to 100; agitating the emulsion, optionally in the presence of an emulsion stabilizer and/or a turbulence minimizing agent, in order to maintain the droplets of said dispersed phase within an average size range of 5 to 200 μm. The catalyst particles are obtained after solidifying said particles of the dispersed phase by heating. In said process an aluminium alkyl compound of the formula AlR$_{3-n}$X$_n$, where R is an alkyl and/or an alkoxy group of 1 to 20, preferably of 1 to 10 carbon atoms, X is a halogen and n is 0, 1, 2 or 3, is added and brought into contact with the droplets of the dispersed phase of the agitated emulsion or during the washing step of the solidified particles before recovering the final solid particles. The aluminium alkyl compound is preferably trialkyl aluminium such as trimethylaluminium, triethylaluminium, tri-isobutylaluminium or tri-n-octylaluminium. However, it may also be an alkylaluminium halide, such as diethylaluminium chloride, dimethylaluminium chloride and ethylaluminium sesquichloride.

Typical examples used as external donors are dicyclopentyldimethoxysilane (DCPDMS), cyclohexylmethyl-dimethoxysilane (CHMDMS) and dicyclopentadienyldiethoxysilane (DCPDES).

Preparation of the Polypropylene (PP)

The polypropylene (PP) may be produced in a single reactor or in a sequential polymerization process. The term "sequential polymerization process" indicates that the polymer, e.g. the polypropylene (PP) according to the present invention, is produced in at least two reactors connected in series.

Such a sequential polymerization process comprises at least a first reactor (R-1) and a second reactor (R-2). In one specific embodiment the sequential polymerization process consists of two the polymerization reactors (R-1) and (R-2). The term "polymerization reactor" shall indicate that the main polymerization takes place. Thus in case the process consists of two polymerization reactors, this definition does not exclude the option that the overall process comprises for instance a pre-polymerization step in a pre-polymerization reactor. The term "consists of" is only a closing formulation in view of the main polymerization reactors.

The first reactor (R-1) or the single reactor is preferably a slurry reactor (SR) and can be any continuous or simple stirred batch tank reactor or loop reactor operating in bulk or slurry. Bulk means a polymerization in a reaction medium that comprises of at least 60% (wt/wt), preferably 100% monomer. According to the present invention the slurry reactor (SR) is preferably a (bulk) loop reactor (LR).

The second reactor (R-2) and any subsequent reactor, if present, are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

A preferred multistage process is a "loop-gas phase"-process, such as developed by Borealis A/S, Denmark (known as BORSTAR® technology) described e.g. in patent literature, such as in EP 0 887 379 or in WO 92/12182.

Preferably in the first reactor (R-1) or in the single reactor, which is preferably a slurry reactor (SR), like a loop reactor (LR), the temperature is more than 65° C., preferably equal or more than 68° C., still more preferably in the range of equal or more than 65° C. to equal or below 95° C., still more preferably in the range of equal or more than 65° C. to equal or below 90° C., more preferably in the range of 65-80° C., and more preferably in the range of 70-75° C.

The pressure in the first reactor (R-1) or in the single reactor, which is preferably a slurry reactor (SR), like a loop reactor (LR), is within the range of 25 bar to 80 bar, preferably between 30 bar to 70 bar, more preferably 40 to 60 bar. Hydrogen can be added for controlling the molar mass in a manner known per se.

In case of a sequential polymerization process subsequently, the reaction mixture from the first reactor (R-1) is transferred to the second reactor (R-2), i.e. to the gas phase reactor (GPR-1), whereby the temperature in the second reactor (R2) is preferably within the range of equal or more than 75° C. to 100° C., more preferably within the range of equal or more than 80° C. to 95° C., more preferably 80-90° C.

Further it is preferred that in the second reactor (R-2), if present, preferably in the gas phase reactor (GPR-1), the pressure is within the range of 5 bar to 50 bar, preferably between 15 bar to 40 bar, more preferably 20 to 30 bar. Hydrogen can be added for controlling the molar mass in a manner known per se.

The residence time can vary in both reactor zones.

The conditions in the other gas phase reactors (GPR), if present, are similar to the second reactor (R-2).

Especially good results are achievable in case the process encompass a pre-polymerization (P) prior to the polymerization in the first reactor (R-1) or in the single reactor. The pre-polymerization (P) can be conducted in the first reactor (R-1), however it is preferred that the pre-polymerization (P) takes place in a separate reactor, so called pre-polymerization reactor (P-R). A pre-polymerization reactor is of smaller size compared to the first (R-1) or the single reactor and second (R-2) reactor, if present, respectively. Preferably, the reaction volume of the pre-polymerization reactor (P-R) will be between 5% and 30% of the reaction volume of the first reactor (R-1) or the single reactor, like the loop reactor. In said pre-polymerization reactor (P-R), the pre-polymerization (P) is performed in bulk or slurry as defined for the first reactor (R-1) or the single reactor above.

Further it is appreciated that the pre-polymerization temperature is rather low, i.e. equal or below 50° C., more preferably between equal or more than 10° C. to equal or below 50° C., yet more preferably between 12 to 45° C., even more preferably between 15 to 40° C., like between 18 and 35° C.

The pressure during pre-polymerization can be between 20 to 80 bar, preferably between 25 to 75 bar, like 30 to 70 bar, or 30-50 bar. Residence times can vary between 0.1 to 1.5 hours, like between 0.2 and 0.8 hours.

Preferably the polymerization process as defined above is carried out using the SCS as defined above.

Additives

The composition according to the present invention may contain additives known in the art, like antioxidants, acid scavengers, nucleating agents, antiblocking agents, and antistatic agents. Typically the composition may contain no more than 5.0 wt %, yet more preferably not more than 3.0 wt %, like not more than 2.0 wt % of additives mentioned herein.

In one embodiment of the invention, the composition comprises 0.1 to 5.0 wt % of one or more additives selected from the group of an antiblocking agent (AB), an antioxidant, an acid scavenger, a nucleating agent, and/or an antistatic agent. Preferred additives are antiblocking agents, antioxidants, and/or acid scavengers.

Preferably, the composition according to the present invention is free of slip agent(s).

A further embodiment prefers antiblocking agents, antioxidants and/or acid scavengers, but is free of slip agents.

The corona retention is a measure of the adhesion of one surface to adjoining surface. The corona retention is represented by ink test result. The greater the adhesion, the higher is the ink test value.

It is to be understood that the addition of an additive is common in the art. Hence, it is to be regarded as disclosed and known to the skilled person that any of the herein mentioned additives, in the amounts mentioned herein, may be singularly or in combination with others added to any of the compositions disclosed herein.

Antioxidants are commonly used in the art, examples are sterically hindered phenols (such as CAS No. 6683-19-8, also sold as Irganox 1010 FF™ by BASF), phosphorous based antioxidants (such as CAS No. 31570-04-4, also sold as Hostanox PAR 24 (FF)™ by Clariant, or Irgafos 168 (FF)™ by BASF), sulphur based antioxidants (such as CAS No. 693-36-7, sold as Irganox PS-802 FL™ by BASF), nitrogen-based antioxidants (such as 4,4'-bis(1,1'-dimethylbenzyl)diphenylamine), or antioxidant blends.

Acid scavengers are also commonly known in the art. Examples are calcium stearates, sodium stearates, zinc stearates, magnesium and zinc oxides, synthetic hydrotalcite (e.g. SHT, CAS-no. 11097-59-9), lactates and lactylates, as well as calcium and zinc stearates.

Common antiblocking agents are natural silica such as diatomaceous earth (such as CAS-no. 60676-86-0 (SuperfFloss™), CAS-no. 60676-86-0 (SuperFloss E™), or CAS-no. 60676-86-0 (Celite 499™)), synthetic silica (such as CAS-no. 7631-86-9, CAS-no. 7631-86-9, CAS-no. 7631-86-9, CAS-no. 7631-86-9, CAS-no. 7631-86-9, CAS-no. 7631-86-9, CAS-no. 112926-00-8, CAS-no. 7631-86-9, or CAS-no. 7631-86-9), silicates (such as aluminum silicate (Kaolin) CAS-no. 1318-74-7, sodium aluminum silicate CAS-no. 1344-00-9, calcined kaolin CAS-no. 92704-41-1, aluminum silicate CAS-no. 1327-36-2, or calcium silicate CAS-no. 1344-95-2), synthetic zeolites (such as sodium calcium aluminosilicate hydrate CAS-no. 1344-01-0, CAS-no. 1344-01-0, or sodium calcium aluminosilicate, hydrate CAS-no. 1344-01-0)

Especially preferred is that the antiblocking agent (AB) is a silicon dioxide and/or silicate. Preferably the antiblocking agent (AB) is a silicon dioxide (SiO2), like a synthetic silicon dioxide. Typically the silicon dioxide has pore volume in the range of 0.8 to 1.2 ml/g and/or a particle size of 3.5 to 6.0 μm.

Nucleating agents are also known in the art. They may be selected from the group of benzoates, such as sodium or lithium benzoate, sorbitol compounds, such as 2,4 di(methylbenzylidene) sorbitol, phosphorous-based compounds such as sodium di(4-tert. butylphenol) phosphate, but also beta-nucleators such as N, N'-dicyclohexyl-2,6-naphtalene dicarboxyamide, rosins such as calcium resinate, and others such as talc.

Antistatic agents are known in the art as well. They may be selected from the group of glyceryl esters such as CAS-no. 97593-29-8, CAS-no. 97593-29-8, or CAS-no. 97593-29-8, ethoxylated amines such as Hostastat FA 18™ from Clariant, ethoxylated amides such as N,N-bis (2-hydroxyethyl) dodecanamide, permanent antistats such as Irgastat™ grades from BASF, or sorbitan based products such as sorbitan monooleate.

The present invention is furthermore directed to a film made from a composition according to the present invention.

Preferably the film has a thickness of 5 to 2,000 μm, preferably of 10 to 1,000 μm, more preferably of 20 to 700 μm, like of 30 to 500 μm.

The film of the present invention preferably has haze of below 5.0%, more preferably below 4.0% and most preferably below 3.3% measured on a 50 μm cast film according to ASTM D1003-00.

The gel index of the film according to the present invention is preferably less than 30, more preferably less than 15 and most preferably less than 12.

One distinguishes between unoriented and oriented films (see for instance polypropylene handbook, Nello Pasquini, 2nd edition, Hanser). Oriented films are typically biaxially oriented films, whereas unoriented films are cast or blown films. Accordingly an unoriented film is not drawn intensively in machine and transverse direction as done by oriented films.

The film according to the present invention is preferably an unoriented film, more preferably a cast film or blown film wherein, optionally, said film is metalized.

Important for a metallizable film is the skin layer. Most preferably, the film is metalized and the skin layer comprises the composition according to the invention.

Preferred features of the composition according to the present invention are also preferred features of the film according to the present invention and vice versa.

The present invention is further directed to a process for producing a film by using a composition according to the present invention, preferably, the composition according to the present invention is fed to a cast film line or blown film line, preferably cast film line, obtaining subsequently a film.

Preferred features of the composition and film according to the present invention are also preferred features of the process according to the present invention and vice versa.

The present invention furthermore relates to the use of a high density polyethylene (HDPE) having a median particle size $d_{50}$ in the range of 370 to 430 μm in a composition comprising additionally a polypropylene to produce with said composition a film with low gel index, preferably, the gel index of a film produced using the composition comprising the high density polyethylene (HDPE) and additionally the polypropylene is lower compared to the gel index of a film (film 2) made under the same conditions using the same composition except that the high density polyethylene (HDPE) is replaced by the same amount by weight of the polypropylene.

Further preferred embodiments of the high density polyethylene (HDPE) are provided above when discussing the inventive composition.

Hence, "low gel index" usually denotes that the gel index of a film produced using the composition comprising the high density polyethylene (HDPE) and additionally the polypropylene is lower compared to the gel index of a film (film 2) made under the same conditions using the same composition except that high density polyethylene (HDPE) is replaced by the same amount by weight of the polypropylene.

Usually the polypropylene is the polypropylene (PP) as defined in the present invention.

Preferred features of the composition, film and process according to the present invention are also preferred features of the use according to the present invention and vice versa.

The present invention is now further described by the following non-limiting examples.

EXAMPLES

The following definitions of terms and determination methods apply for the above general description of the invention as well as to the below examples unless otherwise defined.

Particle Size:

Throughout the present document, the "particle size" of a filler material or other particulate material is described by its distribution of particle sizes. The value $d_x$ represents the diameter relative to which x % by volume of the particles have diameters less than $d_x$. The $d_{50}$ value is thus the volume determined medium particle size, i.e. 50% of the total volume of all particles results from particles smaller than this particle size. For the purpose of the present invention the particle size is specified as volume determined particle size $d_{50}$ unless indicated otherwise. The same applies for the $d_{90}$, $d_{10}$ and SPAN $((D_{90}-D_{10})/D_{50})$ values. For determining the volume determined medium particle size $d_{50}$, top cut $d_{90}$ and $d_{10}$ a Mastersizer 2000 or Mastersizer 3000 from the company Malvern Instruments Ltd., Great Britain, using the Fraunhofer light scattering model is used. The weight determined particle size distribution may correspond to the volume determined particle size if the density of all the particles is equal.

Transparency, haze and clarity were determined according to ASTM D1003-00 on 60×60×1 $mm^3$ plaques injection molded in line with EN ISO 1873-2 using a melt temperature of 200° C. and on cast films of 50 μm thickness produced on a monolayer cast film line with a melt temperature of 220° C. and a chill roll temperature of 20° C.

OCS Gel Index

1. Apparatus

The apparatus consists of a laboratory extruder ME 25/5800 V3 with five heating zones, an adapter and a 150 mm broad die. The follow-on unit encompasses a chillroll CR-9, diameter 140 mm, including Haake C40P heating- and cooling device (15 to 90° C.), a line scan camera FS-5/4096 Pixel (dynamical digital converting of gray scale images) and a wind-up unit with automatic tension control up to 10 N.

2. Material-Specific Settings for Film-Manufacturing

The temperature setting for the heating zones at cylinder and die is classified for polypropylene according to MFR-ranges in six groups:

Group 1: MFR-range 0.2-0.5 g/10 min (230° C./2.16 kg), temperatures 240(feed)/260/270/280/290/290/290° C.

Group 2: MFR-range 0.5 to 1.0 g/10 min (230° C./2.16 kg), temperatures 220(feed)/240/255/270/270/270° C.

Group 3: MFR-range of greater than 1.0 to 2.0 g/10 min (230° C./2.16 kg), temperatures 190(feed)/210/225/240/240/240° C.

Group 4: MFR-range of greater than 2.0 to 4.5 g/10 min (230° C./2.16 kg), temperatures 190(feed)/205/220/230/230/230° C.

Group 5: MFR-range of greater than 4.5 to 8.0 g/10 min (230° C./2.16 kg), temperatures 190(feed)/205/215/220/220/220° C.

Group 6: MFR of greater than 8.0 g/10 min (230° C./2.16 kg), temperatures 180(feed)/195/210/220/220/220° C.

Preset Parameters:

| | |
|---|---|
| Rotational speed (screw): | 20 rpm |
| Haul-off speed: | 2 m/min; |
| The film thickness is 50+/−5 μm | |

3. Measurement

After fulfilment of the following parameters: In case of similar materials ca. 60 min running-in period, in case of highly diverging materials ca. 120 min.

Goal: Adjustment of a homogenous film at constant melt pressure and melt temperature. The measuring area is standardised at 5 $m^2$. The measurement itself is terminated automatically when the area is accomplished. The report will be printed simultaneously.

4. Analysis

The number of found defects is, referring $1/m^2$, class-divided according to size and multiplied with the mass factor, adding up to the gelindex.

| Size class 1 | 100-300 μm | mass factor × 0.1 |
|---|---|---|
| Size class 2 | 301-600 μm | mass factor × 1.0 |
| Size class 3 | 601-1000 μm | mass factor × 5.0 |
| Size class 4 | >1000 μm | mass factor × 10 |

Example

| 17 defects | size class 1 | ×0.1 = 1.7 |
|---|---|---|
| 5 defects | size class 2 | ×1.0 = 5.0 |
| 2 defects | size class 3 | ×5.0 = 10.0 |
| 0 defects | size class 4 | ×10.0 = 0 |
| | | gelindex = 16.7 |

The Ink test was performed according to ISO 8296

The Melt Flow Rate (MFR) was determined according to ISO 1133.

The xylene cold solubles (XCS, wt.-%): Content of xylene cold solubles (XCS) is determined at 25° C. according ISO 16152; first edition; 2005-07-01.

Melting temperature Tm, crystallization temperature Tc: measured with Mettler TA820 differential scanning calorimetry (DSC) on 5 to 10 mg samples. DSC is run according to ISO 11357/part 3/method C2 in a heat/cool/heat cycle with a scan rate of 10° C./min in the temperature range of +23 to +210° C. Crystallization temperature and enthalpy are determined from the cooling step, while melting temperature and melting enthalpy are determined from the second heating step.

Materials:

UNEX HDPE T1 supplied by Dakota nv, Belgium, which is a high density polyethylene in form of a powder having a melting temperature $T_m$ of 130° C., a melt flow rate $MFR_2$ of 20 g/10 min (190° C./2.16 kg), a density of about 940 kg/m³, a d50 of 401.6, a d90 of 712.3, a d10 of 187.9 and a SPAN of 1.31.

MG9601, supplied by *Borealis*, in a form of pellets, which is a high density polyethylene having a density of 960 kg/m³, a melt flow rate $MFR_2$ of 31 g/10 min (190° C./2.16 kg), and a particle size $d_{50}$ of more than 1 mm.

Polypropylene (PP)

The catalyst used in the polymerization processes of the examples was the catalyst as prepared in Example 8 of WO 2004/029112A1 (see pages 22-23), except that diethylaluminium chloride was used as an aluminium compound instead of triethylaluminium.

An external donor, dicyclopentyldimethoxy silane, has been used. The ratio of aluminium to donor was 7.5. Polypropylene has been copolymerized with ethylene in a pilot bimodal multireactor system for polymerization mode consisting of a pre-polymerization, a loop reactor and a gas reactor, with a catalyst of the above-described system and under the following polymerization conditions (Table 1). Technical features of the copolymer obtained are listed in Table 2.

TABLE 1

Polymerization conditions of random copolymer of propylene (PP)

| Example | | PP |
|---|---|---|
| Prepoly | Total prod (kg/h) | 60 |
| | Temperature (° C.) | 30 |
| | Pressure (bar) | 55 |
| | Donor (g/t) | 35 |
| | H2 feed (g/h) | 2.5 |
| | C2 feed (g/h) | 300 |
| Loop Reactor | Temp (° C.) | 70 |
| | Prod (kg/h) | 25 |
| | Pressure (bar) | 55 |
| | C2-content (wt-%) | 2 |
| | C2/production rate (kg/t) | 22 |
| | C2 feed (g/h) | 350 |
| | H2/C3 in Loop (mol/kmol) | 4 |
| | MFR (230° C.) | 8 |
| Gas Reactor | C2/C3 (mol/kmol) | 14 |
| | C2-content (wt-%) | 2 |
| | H2/C3 (mol/kmol) | 40 |
| | MFR (230° C.) | 8 |
| | Temperature (° C.) | 85 |
| | Pressure (bar) | 21 |
| | Split (%) | 55 |

In Table 1, "H2/C3 (mol/kmol)" means the feed ratio of H2/C3, and "C2/C3 mol/kmol" means the feed ratio of C2/C3. The volume of pre-polymerization reactor is very small, and production rate is much less than that in loop reactor and gas reactor. In this case, R-PP1 means the sum of copolymers as produced in pre-polymerization reactor and loop reactor, and R-PP2 means the fraction as produced in gas reactor.

The technical features of the final copolymer product are listed in Table 2.

TABLE 2

Technical features of the random copolymer of propylene (PP)

| | | PP |
|---|---|---|
| $C_2$ | [wt.-%] | 2 |
| $MFR_2$ | [g/10 min] | 8.0 |
| XS | [wt.-%] | 3.5 |

After polymerization, the copolymer had been pelletized in an extruder. The formulation contained regular additives such as a normal acid scavenger (e.g. Ca stearate), antioxidants (e.g. Irganox 1010, Irgafos 168), and anti-blocking agents (e.g. synthetic silica) at a total amount of 0.45 wt %.

CE1:

100 wt. % PP thus prepared was extruded together in a cast machine to form a monolayer cast film with a thickness of 50 μm.

CE2:

96 wt. % of PP thus prepared was co-extruded together with 4 wt. % MG9601 (in pellet form) in a cast machine to form a monolayer cast film with a thickness of 50 μm.

IE1

96 wt. % of PP prepared above was co-extruded together with 4 wt. % cryogenically grounded UNEX HDPE T1 in a cast machine to form a monolayer cast film with a thickness of 50 μm.

TABLE 3

| | Test results | | | | |
|---|---|---|---|---|---|
| | | Ink test | | | |
| | Gel index | Day 7 | Day 14 | Day 21 | Haze |
| CE1 | 16 | 38 | 36 | 36 | 1.4 |
| CE2 | 61 | 38 | 36 | 36 | 3.5 |
| IE1 | 8 | 38 | 36 | 36 | 3.1 |

The use of high density polyethylene (HDPE) which has the inventive particle size only slightly affects the optical properties while significantly improving the gel index. The use of a high density polyethylene (HDPE) powder results in a reduced haze versus the use of high density polyethylene (HDPE) pellets, i.e. a high density polyethylene (HDPE) with a particle size, e.g. $d_{50}$ value, above the claimed range. Moreover, the Corona retention is maintained at the same level.

The invention claimed is:

1. A composition comprising
    (a) at least 85 parts per weight (ppw) based on 100 ppw of the composition of a polypropylene (PP), and
    (b) greater than 0 but not more than 15 parts per weight (ppw) based on 100 ppw of the composition of a high density polyethylene (HDPE),
    wherein said high density polyethylene (HDPE) has particle top cut d90 of below 1000 μm.

2. The composition according to claim 1, wherein the composition is obtained by mixing said polypropylene (PP) with said high density polyethylene (HDPE).

3. The composition according to claim 1, wherein the high density polyethylene (HDPE) has a median particle size d50 of below 800 μm.

4. The composition according to claim 1, wherein the high density polyethylene (HDPE) has
    (a) a melting temperature (Tm) in the range of 120 to 150° C.;
    and/or
    (b) a melt flow rate MFR2 (190° C., 2.16 kg) in the range of 10 to 30 g/10 min;
    and/or
    (c) a density of at least 930 kg/m3.

5. The composition according to claim 1, wherein the polypropylene (PP) is a random propylene copolymer having a comonomer content in the range of 0.5 to 6.0 mol-%.

6. The composition according to claim 1, wherein the polypropylene (PP) has
    (a) a melt flow rate MFR2 (230° C.) measured according to ISO 1133 from 5 to 15 g/10 min;
    and/or
    (b) a xylene cold soluble (XCS) fraction in the range of 1.0 to 6.0 wt.-%.

7. The composition according to claim 1 being free of slip agent(s).

8. A film made from the composition according to claim 1.

9. The film according to claim 8, wherein said film has
    (a) haze of below 5.0% measured on a 50 μm cast film according to ASTM D1003-00;
    and/or
    (b) a gel index of less than 30.

10. The film according to claim 8, wherein the film is a cast film or blown film.

11. A process for producing a composition wherein
    (a) at least 85 parts per weight (ppw) based on 100 ppw of the composition of a polypropylene (PP), and
    (b) greater than 0 but not more than 15 parts per weight (ppw) based on 100 ppw of the composition of a high density polyethylene (HDPE),
    are mixed,
    wherein said high density polyethylene (HDPE) has particle top cut d90 of below 1000 μm.

12. The process according to claim 11, wherein the high density polyethylene (HDPE) has a median particle size d50 of below 800 μm.

13. The for producing a film by feeding a composition according to claim 1 to a cast film line or blown film line and subsequently obtaining a film.

14. The according to claim 11, wherein (a) and (b) are dry- or melt-mixed.

15. The for lowering the gel index of a film, comprising producing a film from a composition comprising a high density polyethylene (HDPE) having a particle top cut d90 of below 1000 μm and a polypropylene.

16. The according to claim 15, wherein the gel index of a film produced using the composition comprising the high density polyethylene (HDPE) and the polypropylene is lower compared to the gel index of a film (film 2) made under the same conditions using the same composition except that the high density polyethylene (HDPE) is replaced by the same amount by weight of the polypropylene.

17. The according to claim 15, wherein
    (a) the high density polyethylene (HDPE) has a median particle size d50 of below 800 μm;
    and/or
    (b) the propylene is a polypropylene (PP) is a random propylene copolymer having a comonomer content in the range of 0.5 to 6.0 mol %;
    and/or
    (c) the composition is free of slip agent(s).

18. The according to claim 15, wherein the composition comprises
    (a) at least 85 parts per weight (ppw) based on 100 ppw of the composition of a polypropylene (PP), and
    (b) greater than 0 but not more than 15 parts per weight (ppw) based on 100 ppw of the composition of a high density polyethylene (HDPE),
    wherein said high density polyethylene (HDPE) has particle top cut d90 of below 1000 μm.

19. The film according to claim 10, wherein said film is metallized.

* * * * *